(12) United States Patent
Weber et al.

(10) Patent No.: US 8,952,109 B2
(45) Date of Patent: Feb. 10, 2015

(54) PROCESS FOR PREPARING A BLOCK COPOLYMER

(75) Inventors: Martin Weber, Maikammer (DE); Thomas Weiβ, Ilvesheim (DE); Christian Maletzko, Altrip (DE); Bastiaan Bram Pieter Staal, Limburgerhof (DE); Claudia Spang, Eisenberg (DE)

(73) Assignee: BASF SE, Ludwigshafen (DE)

( * ) Notice: Subject to any disclaimer, the term of this patent is extended or adjusted under 35 U.S.C. 154(b) by 77 days.

(21) Appl. No.: 13/566,096

(22) Filed: Aug. 3, 2012

(65) Prior Publication Data

US 2013/0035457 A1 Feb. 7, 2013

Related U.S. Application Data

(60) Provisional application No. 61/515,345, filed on Aug. 5, 2011.

(51) Int. Cl.
C08G 65/48 (2006.01)

(52) U.S. Cl.
CPC .................................. C08G 65/48 (2013.01)
USPC ....................................................... 525/534

(58) Field of Classification Search
CPC .. C08G 65/485; C08G 65/48; C08G 65/2612; C08G 65/26
USPC ....................................................... 525/534
See application file for complete search history.

(56) References Cited

U.S. PATENT DOCUMENTS

| | | | |
|---|---|---|---|
| 4,948,508 A * | 8/1990 | Nakagawa et al. | 210/500.33 |
| 5,242,990 A * | 9/1993 | Arashiro et al. | 525/396 |
| 5,700,902 A | 12/1997 | Hancock et al. | |
| 5,700,903 A | 12/1997 | Hancock et al. | |
| 5,798,437 A | 8/1998 | Hancock et al. | |
| 5,861,471 A | 1/1999 | Pudleiner et al. | |
| 5,911,880 A | 6/1999 | Klein et al. | |
| 6,365,678 B1 | 4/2002 | Reuter et al. | |
| 6,761,989 B2 * | 7/2004 | Terahara et al. | 429/493 |
| 2006/0160960 A1 * | 7/2006 | Chang et al. | 525/344 |
| 2011/0218294 A1 | 9/2011 | Weber et al. | |
| 2011/0224386 A1 | 9/2011 | Weber et al. | |
| 2011/0237693 A1 | 9/2011 | Weber et al. | |
| 2011/0237694 A1 | 9/2011 | Weber et al. | |
| 2011/0244743 A1 | 10/2011 | Scherzer et al. | |
| 2011/0294912 A1 | 12/2011 | Weber et al. | |
| 2012/0088048 A1 | 4/2012 | Scherzer et al. | |
| 2012/0149796 A1 | 6/2012 | Weber et al. | |
| 2012/0153232 A1 | 6/2012 | Gibon et al. | |
| 2012/0153233 A1 | 6/2012 | Gibon et al. | |
| 2012/0181487 A1 | 7/2012 | Gibon et al. | |
| 2012/0213998 A1 | 8/2012 | Weber et al. | |
| 2012/0252962 A1 | 10/2012 | Weber et al. | |
| 2012/0273423 A1 | 11/2012 | Weber et al. | |
| 2012/0296028 A1 | 11/2012 | Weber et al. | |
| 2012/0296031 A1 | 11/2012 | Weber et al. | |
| 2013/0035457 A1 * | 2/2013 | Weber et al. | 525/534 |
| 2014/0038867 A1 * | 2/2014 | Baker et al. | 508/290 |

FOREIGN PATENT DOCUMENTS

| | | | |
|---|---|---|---|
| CA | 2783940 A1 | 6/2011 | |
| DE | 3915348 C2 | 5/1992 | |
| DE | 19907605 A1 | 8/2000 | |
| EP | 0739925 A2 | 10/1996 | |
| EP | 781795 A2 | 7/1997 | |
| WO | WO-97/05190 A1 | 2/1997 | |
| WO | WO-97/22406 A1 | 6/1997 | |
| WO | PCT/EP2009/065035 | 11/2009 | |
| WO | WO-2010057822 A1 | 5/2010 | |
| WO | WO-2011/020823 A1 | 2/2011 | |
| WO | WO-2011/073196 A1 | 6/2011 | |
| WO | WO-2011/073197 A1 | 6/2011 | |
| WO | WO-2011/107389 A1 | 9/2011 | |
| WO | WO-2011/117085 A1 | 9/2011 | |
| WO | WO-2011/117153 A1 | 9/2011 | |
| WO | WO-2011/051273 A3 | 11/2011 | |
| WO | WO-2011/147758 A1 | 12/2011 | |
| WO | WO-2012/088048 A1 | 6/2012 | |
| WO | WO-2012/098109 A1 | 7/2012 | |

OTHER PUBLICATIONS

U.S. Appl. No. 13/548,698, filed Jul. 13, 2012.
Ting, et al., "Preparation of Polysulfone/Poly(ethylene oxide) Block Copolymers", *Macromolecules*, vol. 29, (1996), p. 7619-7621.
European Search Report for Registration No. EP 11 17 6718.

* cited by examiner

*Primary Examiner* — Mike M Dollinger
(74) *Attorney, Agent, or Firm* — Drinker Biddle & Reath LLP

(57) ABSTRACT

The present invention relates to a process for preparing a block copolymer comprising poly-arylene ether and poly-alkylene oxide blocks, comprising the reaction of an HO-terminated poly-arylene ether with a monomeric alkylene oxide.

The present invention also relates to a block copolymer obtainable from this process.

The invention additionally relates to a triblock polymer with polyalkylene oxide-polyaryl ether-polyalkylene oxide blocks.

8 Claims, No Drawings

PROCESS FOR PREPARING A BLOCK COPOLYMER

CROSS-REFERENCE TO RELATED APPLICATIONS

This application claims the benefit of U.S. Provisional Application 61/515,345, filed Aug. 5, 2011, which is incorporated herein by reference.

BACKGROUND OF THE INVENTION

The present invention relates to a process for preparing a block copolymer comprising polyarylene ether and polyalkylene oxide blocks, comprising the reaction of an HO-terminated polyarylene ether with a monomeric alkylene oxide.

The present invention also relates to a block copolymer obtainable from this process.

The invention additionally relates to a triblock polymer with polyalkylene oxide-polyaryl ether-polyalkylene oxide blocks is.

The invention also relates to a molding composition comprising from 1 to 60% by weight of at least one block copolymer comprising polyarylene ether and polyalkylene oxide blocks.

The invention also relates to the use of at least one such block copolymer or of a molding composition for production of coatings, films, fibers, moldings and/or membranes.

The invention relates to membranes comprising such a block copolymer or such a molding composition.

The literature discloses polyarylene ether-polyalkylene oxides. They form part of the class of the hydrophilic-hydrophobic block copolymers, which have great potential for use especially in the medical technology sector.

For instance, U.S. Pat. No. 5,700,902 describes the synthesis of polyarylene ether-polyalkylene oxide copolymers. One use is that of specially modified polyalkylene oxide derivatives as regulators in the polycondensation of bisphenols and dichlorodiphenyl sulfone, or else polyalkylene oxides with OH end groups are used as a comonomer in the synthesis of the polyarylene ethers.

U.S. Pat. No. 5,798,437 also describes polyarylene ether-polyalkylene oxide copolymers.

U.S. Pat. No. 5,911,880 provides membranes which, in addition to polyarylene ethers, comprise a block copolymer of polyarylene ether and polyalkylene oxide for hydrophilization. For structure control, activated polyalkylene oxides are reacted with OH- or NH$_2$-terminated polyarylene ethers.

EP 781795 describes a similar approach for preparation of the block copolymers to U.S. Pat. No. 5,911,880. Here, Cl-terminated polyalkylene oxides as a comonomer are reacted with dichlorodiphenyl sulfone and a diphenol under the action of potash.

EP 739925 also describes polyarylene ether and polyalkylene oxide copolymers.

The synthesis of polyarylene ether-polyalkylene oxide copolymers described in Macromolecules 29 (23) p. 7619 (1996) requires long reaction times.

The process of DE 199 07 605 shows products with low structure control.

DETAILED DESCRIPTION OF THE INVENTION

It was thus an object of the present invention to provide a process for preparing polyarylene ether-polyalkylene oxide block copolymers, which gives block copolymers with a narrow molecular weight distribution. In addition, a synthesis proceeding from reactants which are of good meterability and of simple structure was to be provided. The synthesis was also to proceed from standard starting materials. The invention was additionally to achieve the object of providing block copolymers with a low proportion of polyalkylene oxide. Furthermore, the first process step of polyarylene ether preparation and the second process step of the reaction thereof with monomeric alkylene oxide was to be performable as far as possible in one solvent or solvent mixture, or the second process step even without solvent. The use of only one solvent or solvent mixture enables simplified solvent storage, solvent circulation and/or solvent recovery in the case of industrial scale plants.

The object is achieved by the process mentioned at the outset.

In the process for preparing a block copolymer comprising polyarylene ether and polyalkylene oxide blocks, an HO-terminated polyarylene ether is reacted with a monomeric alkylene oxide. In this process, the HO-terminated polyarylene ether can be prepared in a first step and reacted with a monomeric alkylene oxide in a second step. In one embodiment, the reaction can be performed in the presence of a solvent, especially of an NMP-containing solvent.

The OH-terminated polyarylene ether is also referred to hereinafter as polyarylene ether (P). OH-terminated polyarylene ethers are known as such to those skilled in the art and can be formed from units of the general formula I having predominantly phenoxide end groups

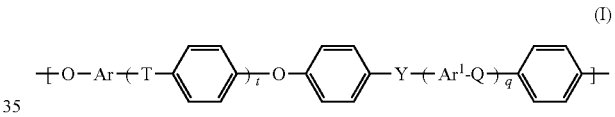

with the following definitions:
t, q: each independently 0, 1, 2 or 3,
Q, T, Y: each independently a chemical bond or group selected from —O—, —S—, —SO$_2$—, S=O, C=O, —N=N—, —CR$^a$R$^b$— where R$^a$ and R$^b$ are each independently a hydrogen atom or a C$_1$-C$_{12}$-alkyl, C$_1$-C$_{12}$-alkoxy or C$_6$-C$_{18}$-aryl group, where at least one of Q, T and Y is not —O—, and at least one of Q, T and Y is —SO$_2$—, and
Ar, Ar$^1$: each independently an arylene group having from 6 to 18 carbon atoms.

In the context of the present invention, phenoxide end groups are understood to mean negatively charged oxygen atoms in the form of an end group bonded to an aromatic ring. These end groups derive from the phenolic end groups by removal of a proton. In the context of the present invention, a phenolic end group is understood to mean a hydroxyl group bonded to an aromatic ring. The aromatic rings mentioned are preferably 1,4-phenylene groups. The polyarylene ethers (P) of the present invention may have firstly phenoxide or phenolic OH end groups, and secondly halogen end groups. Phenoxide groups are counted among the HO end groups in the present invention.

The expression "predominantly phenoxide end groups" is understood to mean that more than 50% of the end groups present are phenoxide end groups. Correspondingly, the expression "predominantly phenolic end groups" is understood to mean that more than 50% of the end groups present are phenolic in nature.

The proportion of phenoxide end groups is preferably determined by determining the OH end groups by means of potentiometric titration, and determining the organically bonded halogen end groups by means of atomic spectroscopy and subsequent calculation of the respective numerical proportions in % by weight or mol %. Appropriate methods are known to those skilled in the art. The polyarylene ethers are typically prepared by polycondensation of suitable starting compounds in dipolar aprotic solvents at elevated temperature (see, for example, R. N. Johnson et al., J. Polym. Sci. A-1 5 (1967) 2375, J. E. McGrath et al., Polymer 25 (1984) 1827). One possible synthesis of the OH-terminated polyarylene ethers is described in PCT/EP2009/065035.

If, in a preferred embodiment of the invention, the OH-terminated polyarylene ether is prepared in a first stage, the polyarylene ether(s) (P) with predominantly phenoxide end groups can be provided by reacting at least one starting compound of the structure X—Ar—Y (A1) with at least one starting compound of the structure HO—Ar$^1$—OH (A2) in the presence of a solvent (L) and of a base (B), where Y is a halogen atom, X is selected from halogen atoms and OH, preferably from halogen atoms, especially F, Cl or Br, and Ar and Ar$^1$ are each independently an arylene group having 6 to 18 carbon atoms.

It is possible to provide, in the presence of a solvent (L), a polyarylene ether (P) which is formed from units of the general formula I with the definitions as above and has predominantly phenoxide end groups:

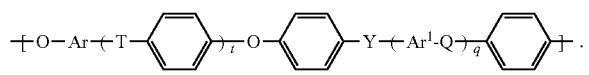

(I)

The polyarylene ether (P) preferably has at least 60%, more preferably at least 80%, especially at least 90%, of phenoxide end groups based on the total number of end groups.

If Q, T or Y, with the abovementioned prerequisites, is a chemical bond, this is understood to mean that the group adjacent to the left and the group adjacent to the right are bonded directly to one another via a chemical bond.

Preferably, Q, T and Y in formula (I), however, are independently selected from —O— and —SO$_2$—, with the proviso that at least one of the group consisting of Q, T and Y is —SO$_2$—.

When Q, T or Y are —CR$^a$R$^b$—, R$^a$ and R$^b$ are each independently a hydrogen atom or a C$_1$-C$_{12}$-alkyl, C$_1$-C$_{12}$-alkoxy or C$_6$-C$_{18}$-aryl group.

Preferred C$_1$-C$_{12}$-alkyl groups comprise linear and branched, saturated alkyl groups having from 1 to 12 carbon atoms. Particular mention should be made of the following radicals: C$_1$-C$_6$-alkyl radicals such as methyl, ethyl, n-propyl, isopropyl, n-butyl, sec-butyl, 2- or 3-methylpentyl and longer-chain radicals such as unbranched heptyl, octyl, nonyl, decyl, undecyl, lauryl, and the singularly or multiply branched analogs thereof.

Useful alkyl radicals in the aforementioned usable C$_1$-C$_{12}$-alkoxy groups include the alkyl groups having from 1 to 12 carbon atoms defined above. Cycloalkyl radicals usable with preference comprise especially C$_3$-C$_{12}$-cycloalkyl radicals, for example cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclpentylethyl, -propyl, -butyl, -pentyl, -hexyl, cyclohexylmethyl, -dimethyl, -trimethyl.

Ar and Ar$^1$ are each independently a C$_6$-C$_{18}$-arylene group. Proceeding from the starting materials described below, Ar is preferably derived from an electron-rich, readily electrophilically attackable aromatic substance which is preferably selected from the group consisting of hydroquinone, resorcinol, dihydroxynaphthalene, especially 2,7-dihydroxynaphthalene, and 4,4'-bisphenol. Ar$^1$ is preferably an unsubstituted C$_6$- or C$_{12}$-arylene group.

Useful C$_6$-C$_{18}$-arylene groups Ar and Ar$^1$ are especially phenylene groups, such as 1,2-, 1,3- and 1,4-phenylene, naphthylene groups, for example 1,6-, 1,7-, 2,6- and 2,7-naphthylene, and the arylene groups derived from anthracene, phenanthrene and naphthacene.

Preferably, Ar and Ar$^1$ in the preferred embodiments of the formula (I) are each independently selected from the group consisting of 1,4-phenylene, 1,3-phenylene, naphthylene, especially 2,7-dihydroxynaphthalene, and 4,4'-bisphenylene.

Units present with preference within the polyarylene ether (P) are those which comprise at least one of the following repeat structural units Ia to Io:

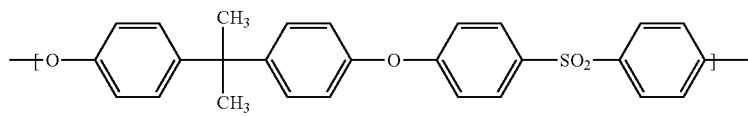

Ia

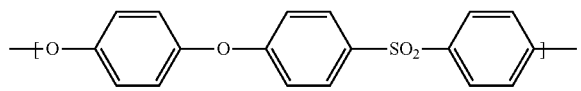

Ib

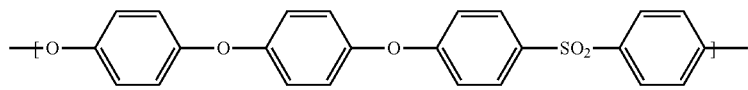

Ic

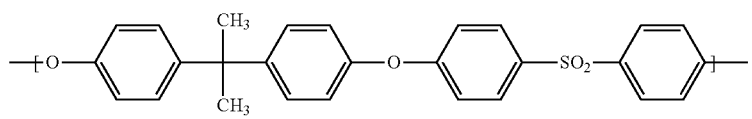

Id

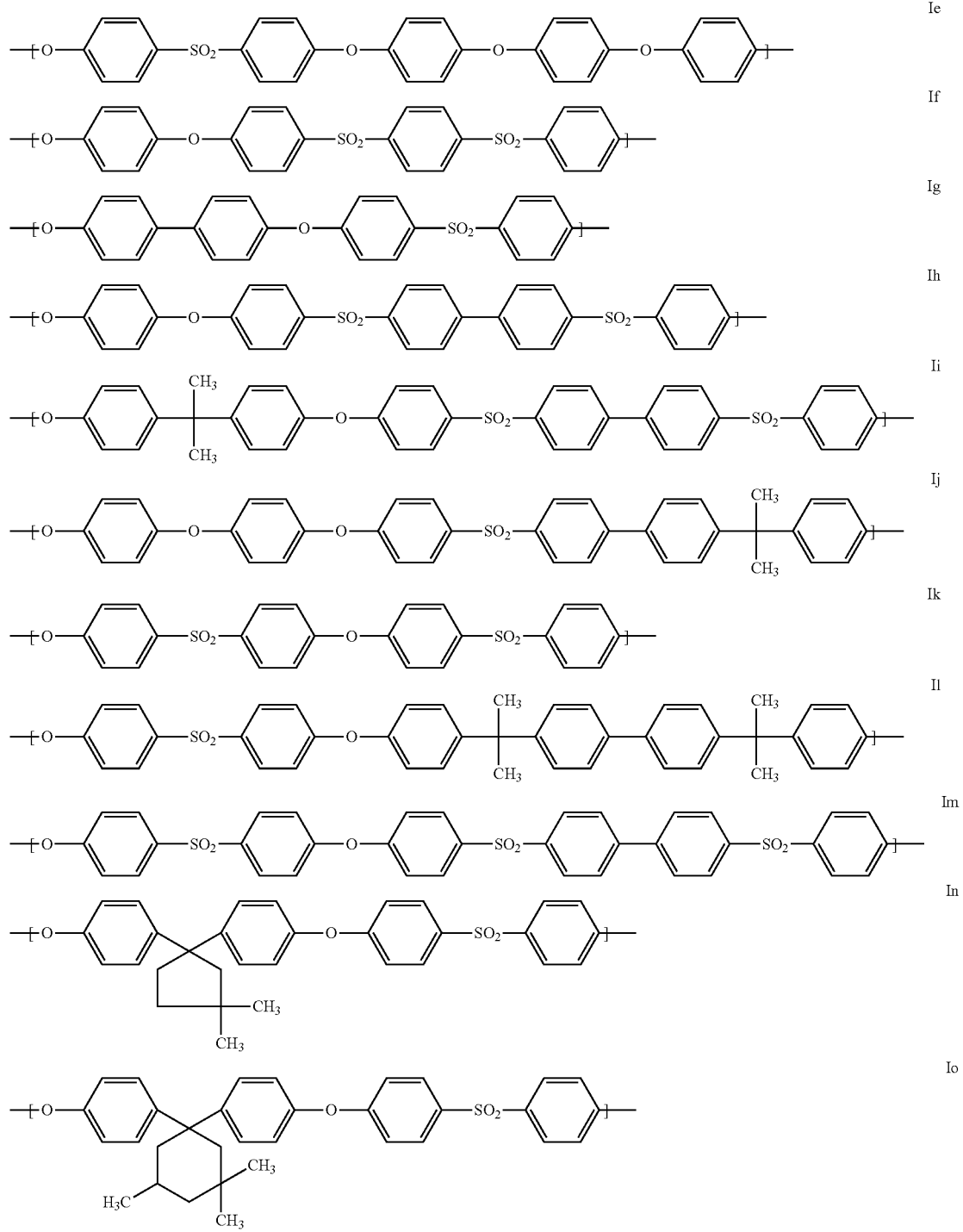

In addition to the units Ia to Io present with preference, preference is also given to those units in which one or more 1,4-dihydroxyphenyl units are replaced by resorcinol or dihydroxynaphthalene units.

Particularly preferred units of the general formula I are units Ia, Ig and Ik. It is also particularly preferred when the polyarylene ethers (P) are formed essentially from one kind of units of the general formula I, especially from one unit selected from Ia, Ig and Ik.

In a particularly preferred embodiment, Ar=1,4-phenylene, t=1, q=0, T=$SO_2$ and Y=$SO_2$. Such polyarylene ethers are referred to as polyether sulfone (PESU).

Apart from the repeating units mentioned, the structure of the end groups is essential to the present invention. The polyarylene ethers (P) which are provided have, in accordance with the invention, predominantly phenoxide end groups.

The polyarylene ether (P) preferably has a mean molecular weight $M_n$ (number average) in the range from 2000 to 60 000 g/mol, especially 5000 to 40 000 g/mol, determined as described above by end group analysis.

The polyarylene ether (P) preferably has a relative viscosity of 0.20 to 0.95 dl/g, especially of 0.30 to 0.80. According to the solubility of the polyarylene ether sulfones, the relative viscosity can be measured in 1% by weight N-methylpyrrolidone solution, in mixtures of phenol and dichlorobenzene, or in 96% sulfuric acid, in each case at 20° C. or 25° C.

The ratio of the starting compounds (A1) and (A2) in the synthesis can be selected such that the number of phenolic or phenoxide end groups exceeds the number of halogen end groups.

Suitable starting compounds are known to those skilled in the art and are not subject to any fundamental restriction, provided that the substituents mentioned are sufficiently reactive within a nucleophilic aromatic substitution.

Preferred starting compounds are difunctional. "Difunctional" means that the number of groups reactive in the nucleophilic aromatic substitution is two per starting compound. A further criterion for a suitable difunctional starting compound is a sufficient solubility in the solvent, as explained in detail below.

Preferred compounds (A2) are accordingly those having two phenolic hydroxyl groups.

The person skilled in the art is aware that the phenolic OH groups are preferably reacted in the presence of a base in order to increase the reactivity toward the halogen substituents of the starting compound (A1).

Preference is given to monomeric starting compounds, which means that the reaction is preferably performed proceeding from monomers and not proceeding from prepolymers.

The starting compound (A1) used is preferably a dihalodiphenyl sulfone. The starting compound (A2) used is preferably dihydroxydiphenyl sulfone.

Suitable starting compounds (A1) are especially dihalodiphenyl sulfones such as 4,4'-dichlorodiphenyl sulfone, 4,4'-difluorodiphenyl sulfone, 4,4'-dibromodiphenyl sulfone, bis(2-chlorophenyl)sulfones, 2,2'-dichlorodiphenyl sulfone and 2,2'-difluorodiphenyl sulfone, particular preference being given to 4,4'-dichlorodiphenyl sulfone and 4,4'-difluorodiphenyl sulfone.

Preferred starting compounds (A2) having two phenolic hydroxyl groups are selected from the following compounds:
  dihydroxybenzenes, especially hydroquinone and resorcinol;
  dihydroxynaphthalenes, especially 1,5-dihydroxynaphthalene, 1,6-dihydroxynaphthalene, 1,7-dihydroxynaphthalene, and 2,7-dihydroxynaphthalene;
  dihydroxybiphenyls, especially 4,4'-biphenol and 2,2'-biphenol;
  bisphenyl ethers, especially bis(4-hydroxyphenyl)ether and bis(2-hydroxyphenyl)ether;
  bisphenylpropanes, especially 2,2-bis(4-hydroxyphenyl) propane, 2,2-bis(3-methyl-4-hydroxyphenyl)propane and 2,2-bis(3,5-dimethyl-4-hydroxyphenyl)propane;
  bisphenylmethanes, especially bis(4-hydroxyphenyl) methane;
  bisphenyl sulfones, especially bis(4-hydroxyphenyl) sulfone;
  bisphenyl sulfides, especially bis(4-hydroxyphenyl) sulfide;
  bisphenyl ketones, especially bis(4-hydroxyphenyl) ketone;
  bisphenylhexafluoropropanes, especially 2,2-bis(3,5-dimethyl-4-hydroxyphenyl)hexafluoropropane; and
  bisphenylfluorenes, especially 9,9-bis(4-hydroxyphenyl) fluorene.

It is preferable, proceeding from the aforementioned aromatic dihydroxyl compounds (A2), by addition of a base (B), to prepare the dipotassium or disodium salts thereof and to react them with the starting compound (A1). The aforementioned compounds can additionally be used individually or as a combination of two or more of the aforementioned compounds.

Hydroquinone, resorcinol, dihydroxynaphthalene, especially 2,7-dihydroxynaphthalene, bisphenol A, dihydroxydiphenyl sulfone and 4,4'-bisphenol are particularly preferred as starting compound (A2).

However, it is also possible to use trifunctional compounds. In this case, branched structures are the result. If a trifunctional starting compound (A2) is used, preference is given to 1,1,1-tris(4-hydroxyphenyl)ethane.

The ratios to be used derive in principle from the stoichiometry of the polycondensation reaction which proceeds with theoretical elimination of hydrogen chloride, and are established by the person skilled in the art in a known manner. In order, however, to increase the number of phenolic OH end groups, an excess of OH end groups is preferable.

The preparation of polyarylene ethers with simultaneous control of the end groups is known per se to those skilled in the art and is described in detail below.

In a preferred embodiment, the ratio of halogen end groups to phenolic end groups is adjusted by controlled establishment of an excess of the difunctional starting compound (A2) in relation to a dihalogen compound as starting compound (A1), i.e. X=Y=halogen.

More preferably, the molar (A2)/(A1) ratio in this embodiment is from 1.005 to 1.2, especially from 1.01 to 1.15, most preferably from 1.02 to 1.1.

Alternatively, it is also possible to use a starting compound (A1) where X=halogen and Y=OH. In this case, an excess of hydroxyl groups is established by addition of the starting compound (A2). In this case, the ratio of phenolic end groups used to halogen is preferably from 1.01 to 1.2, especially from 1.03 to 1.15, most preferably 1.05 to 1.1.

Preferably, the conversion in the polycondensation is at least 0.9, which ensures a sufficiently high molecular weight.

Solvents (L) preferred in the context of the present invention are organic, especially aprotic polar solvents. Suitable solvents also have a boiling point in the range from 80 to 320° C., especially 100 to 280° C., preferably from 150 to 250° C. Suitable aprotic polar solvents are, for example, high-boiling ethers, esters, ketones, asymmetrically halogenated hydrocarbons, anisole, dimethylformamide, dimethyl sulfoxide, sulfolane, N-methyl-2-pyrrolidone and/or N-ethyl-2-pyrrolidone. It is also possible to use mixtures of these solvents.

A preferred solvent is especially N-methyl-2-pyrrolidone and/or N-ethyl-2-pyrrolidone.

Preferably, the starting compounds (A1) and (A2) are reacted in the aprotic polar solvents (L) mentioned, especially N-methyl-2-pyrrolidone.

The starting compounds (A1) and (A2) are reacted in the presence of a base (B). The bases are preferably anhydrous. Suitable bases are especially anhydrous alkali metal and/or alkaline earth metal carbonate, preferably sodium carbonate, potassium carbonate, calcium carbonate or mixtures thereof, very particular preference being given to potassium carbonate, especially potassium carbonate with a volume-weighted mean particle size of less than 100 micrometers, determined with a particle size measuring instrument in a suspension of N-methyl-2-pyrrolidone.

A particularly preferred combination is N-methyl-2-pyrrolidone as solvent (L) and potassium carbonate as base (B).

The reaction of the suitable starting compounds (A1) and (A2) is performed at a temperature of 80 to 250° C., preferably 100 to 220° C., the upper temperature limit being determined by the boiling point of the solvent.

The reaction is effected preferably within a time interval of 2 to 12 h, especially of 3 to 8 h.

The provision or preparation of the HO-terminated polyarylene ether is followed by the inventive reaction with monomeric alkylene oxide. If alkylene oxides react to give oligomers in the reaction solution, the HO-terminated polyarylene ether can also react with these oligomers.

Preferably, the block copolymer is prepared without preceding workup of the HO-terminated polyarylene ether. More preferably, the HO-terminated polyarylene ether is thus reacted without the prior isolation thereof from the reaction mixture, for example N-methylpyrrolidone, in which the HO-terminated polyarylene ether has been prepared beforehand.

Useful alkylene oxides include monomeric alkylene oxide or mixtures of different alkylene oxides. The alkylene oxide may have at least two or more carbon atoms. For example, it is possible to use ethylene oxide, propylene oxide, 1,2-butylene oxide, 2,3-butylene oxide, 1,2-pentene oxide, 2,3-pentene oxide or epichlorohydrin and/or mixtures thereof. It is possible with preference to use ethylene oxide, propylene oxide, 1,2-butylene oxide, 2,3-butylene oxide and/or mixtures thereof. For example, ethylene oxide and/or propylene oxide is/are used.

The alkoxylation of the OH-terminated polyarylene ether can be performed in substance or in an organic solvent. Preference is given to performing the alkoxylation in an organic solvent.

The process conditions for the alkoxylation are described in detail below.

It may be advantageous, prior to the alkoxylation, to dewater the reaction mixture consisting of the activator, preferably the solvent, and the alkoxylation catalyst. This is accomplished in a simple step by heating to 80 to 150° C. under reduced absolute pressure of 0.01 to 0.5 bar in the case that no solvent is used, or in an azeotropic distillation of portions of the solvent in the case that a solvent is used.

Preference is given to performing the process under inert gas atmosphere (e.g. under nitrogen). More particularly, the process can be performed with substantial exclusion of oxygen, carbon dioxide and water.

The reaction with alkylene oxides is advantageously effected by reaction in pressure vessels such as autoclaves or steel reactors, within a pressure range between standard pressure and 10 bar gauge, especially to 8 bar gauge. The reaction temperature, depending on the alkylene oxide used, is from 70 to 200° C., especially from 100 to 180° C. In these ranges, different pressure programs are also possible. Preferred reaction temperatures are, for instance, from 140 to 150° C. in the case of butylene oxide, for instance from 130 to 140° C. in the case of propylene oxide, and for instance from 120 to 130° C. in the case of ethylene oxide. The addition rate of the alkylene oxide is, for example, in the range from 0.5 to 2 mol/h, preferably from 1 to 1.5 mol/h.

Examples of suitable organic, especially polar aprotic, solvents are ethers, especially cyclic ethers such as tetrahydrofuran (THF), dioxane; N,N-dialkylamides such as dimethylformamide and dimethylacetamide, and N-alkyllactams such as N-methylpyrrolidone. It is also possible to use corresponding mixtures of the solvents.

Preference is given to selecting the solvent which was already used in step (A) in the synthesis of the OH-terminated polyarylene ether.

Catalysts described for the ring-opening polymerization (alkoxylation) are cationically initiating catalysts such as $BR_3$ adducts (especially R=F, $C_5F_5$), metal halides such as $AlCl_3$, $ZnCl_2$, $SnCl_4$, $SnCl_2$, metal alkyl carboxylates, for example Cr(II) oleate, metal alkoxides, for example $Ba(OR)_2$, $Al(OR)_3$, $Ti(OR)_4$, but also oxonium and carbonium salts. Recently, solid phase catalysts such as double metal cyanides, basic aluminates and mixed silicates such as hydrotalcites have also been used, because a complex purification of the reaction products can be omitted due to the high activity with the catalyst remaining in the product, or by simple filtration. The anionically initiated ring-opening polymerization of alkylene oxides can be performed with basic catalysts such as alkali metal hydroxides, alkali metal alkoxides, tertiary amines, organic phosphines. Suitable alkali metal alkoxides are especially sterically hindered alkoxides, especially sodium and potassium salts, for example potassium tert-butoxide.

The amount of catalyst is guided by the alkylene oxide conversions and is between 0.1 and 10% by weight in relation to the end product.

In a further specific embodiment, the addition of the alkoxylation catalyst can be dispensed with entirely or partially when the OH-terminated polyarylene ethers, as a result of preparation, are already present with phenoxide end groups and therefore need not be obtained by addition of basic catalysts.

In one embodiment, the separately prepared and purified OH-terminated polyarylene ethers can be dissolved in suitable solvents such as N-methylpyrrolidone, N,N-dimethylacetamide, dimethylformamide or γ-butyrolactone, and then react further with alkylene oxides as starter molecules as described above.

The inventive block copolymer can be isolated by precipitating the polymer solution in water or mixtures of water with further solvents. The precipitated block copolymer can then be extracted with water and then dried.

In one embodiment of the invention, the precipitation can be accomplished in an acidic medium. Suitable acids are known to those skilled in the art. Especially suitable are organic or inorganic acids. For example, carboxylic acids such as acetic acid, propionic acid, succinic acid or citric acid, or mineral acids, for example hydrochloric acid, sulfuric acid or phosphoric acid, can be used.

The process provides the inventive block copolymer which has a residual content of unbound polyalkylene oxide of less than 0.3% by weight, preferably less than 0.2% by weight, especially less than 0.1% by weight. An illustrative determination of the residual polyalkylene oxide content by means of HPLC is described in the examples section.

The invention additionally relates to a block copolymer which is preparable by the process described above. The invention also relates to the block copolymer from the process, which is preferably a triblock copolymer. More particularly, the inventive block copolymer may be a triblock polymer with polyalkylene oxide-polyarylene ether-polyalkylene oxide blocks.

The invention additionally relates to a triblock polymer with polyalkylene oxide-polyarylene ether-polyalkylene oxide blocks as such.

Both the block copolymer from the process and the triblock copolymer have, in one embodiment of the invention, a ratio of Mw/Mn measured by gel permeation chromatography of 1.5 to 3.0, especially of 2.2 to 2.9, preferably of 2.3 to 2.8. In the case of PSU-polyalkylene oxide block copolymers, the measurement can be effected with THF as a solvent and polystyrene as a standard, and a refractive index detector (RI detector) can be used for the analysis. All other polyarylene ether-polyalkylene oxide block copolymers, such as PESU- and PPSU-based polyalkylene oxide block copolymers, can be analyzed with DMAc as a solvent and PMMA as a standard and an RI detector.

In one embodiment of the invention, the block copolymer, and also the polyalkylene oxide-polyarylene ether-polyalkylene oxide block copolymer, has an Mw of 10 000 to 90 000 g/mol, especially of 15 000 to 80 000 g/mol, preferably of 20 000 to 70 000 g/mol, measured by means of GPC. The measurement method has already been described above.

In one embodiment of the invention, the block copolymer, and also the polyalkylene oxide-polyarylene ether-polyalkylene oxide block copolymer, has a viscosity number of 15 to 100, especially of 20 to 95, preferably of 25 to 90. The determination of the viscosity number is effected on a 1% solution of N-methylpyrrolidone at 25° C. to DIN EN ISO 1628-1.

The present invention additionally relates to a molding composition which comprises from 1 to 60% by weight of at least one inventive block copolymer or mixtures of different block copolymers. The molding composition may comprise, for example, a triblock copolymer as the block copolymer. The molding composition may additionally comprise from 40 to 99% by weight of at least one polyarylene ether, where the percentages by weight are based on the sum of block copolymer and polyarylene ether and this sum is 100% by weight. Suitable polyarylene ethers which can be added to the molding composition are, for example, PSU and/or PPSU and/or copolymers of the structures mentioned.

The invention additionally relates to the use of at least one inventive block copolymer, for example of a triblock copolymer with polyalkylene oxide-polyarylene ether-polyalkylene oxide blocks, for production of coatings, fibers, films, moldings and/or membranes. The invention likewise relates to the use of molding compositions which comprise inventive block copolymer and/or triblock copolymer for production of coatings, fibers, films, moldings and/or membranes.

In the context of the invention, "coating" is understood to mean, for example, a layer fixed to the surface of a carrier material, especially adhering thereon. The coating can be applied by a manufacturing process to DIN 8580. A coating in the context of the present application may be a thin layer or a thick layer, or else one or more intrinsically coherent layers. The carrier materials used may be almost all known materials, such as metals, insulators, semiconductors, crystalline or amorphous materials, textile fabrics (wovens, nonwovens, knits) or films.

A fiber in the context of the invention is a flexible structure which is thin in relation to the length.

A molding in the context of the invention is an essentially solid geometric body which can be produced, for example, by molding processes, injection molding, extrusion, calendering, rotomolding, foaming, blow-molding processes, forming processes or joining processes.

A membrane according to the present invention is a separating layer. In the context of the invention, a membrane may be understood to mean an impervious, partly impervious or selectively permeable membrane, or a membrane which is pervious in one direction or a pervious membrane.

The inventive block copolymer or the molding composition comprising the inventive block copolymers can be used in different filter membrane geometries. For instance, the block copolymers can be used in flat membranes and/or in capillary-like hollow fiber membranes. The flow toward these membranes may take the form of a dead-end flow or of a crossflow.

The membranes in the context of the invention can be used in medical technology. In addition, the membranes can be used for liquid processing, especially for water processing.

In a particular embodiment, the invention relates to films or fibers with a wall thickness of 0.5 to 100 µm, comprising from 1 to 60% by weight of the inventive block copolymer and/or of the triblock copolymer comprising polyalkylene oxide-polyarylene ether-polyalkylene oxide blocks, and from 40 to 99% by weight of polyarylene ethers, where the percentages by weight are based on the sum of block copolymer and polyarylene ether and this sum is 100% by weight. In one embodiment of the invention, it is preferable when the polyarylene ether block of the block copolymer is of the same structure as the added polyarylene ether.

EXAMPLES

DIN EN ISO 1628-1: Plastics—Determination of the viscosity of polymers in dilute solution using capillary viscometers—Part 1: General principles (ISO 1628-1:2009); German version EN ISO 1628-1:2009

DIN EN ISO 1043-1: Plastics—Symbols and abbreviated terms—Part 1: Basic polymers and their special characteristics (ISO 1043-1:2001); German version EN ISO 1043-1:2002.

The viscosity number of the polyarylene ethers was determined in 1% solution of N-methylpyrrolidone at 25° C. to DIN EN ISO 1628-1.

The composition of the products was determined by means of $^1$H NMR spectroscopy.

The glass transition temperature of the products was determined by DSC analysis with a heating rate of 20 K/min. The figures reported are the values determined in the 2nd heating run.

In the case of PSU-polyalkylene oxide block copolymers, the molecular weight distribution of the products was determined by means of GPC. In this case, the analysis was conducted with THF as the solvent and PS as the standard, and an RI detector.

In the case of all other polyarylene ether-polyalkylene oxide block copolymers, such as PESU- and PPSU-based polyalkylene oxide block copolymers, the GPC analyses were conducted with DMAc as the solvent, to which 0.5% LiBr had been added, and PMMA as the standard and an RI detector.

To determine the residual unbound polyalkylene oxide content by means of HPLC analysis, 50 mg of polymer were dissolved in 1 ml of DMAc and then diluted with 3 ml of THF. This solution was filtered (pore size 0.2 µm) and injected to a column head of a C18 RP column. This was followed by elution with THF/water in a ratio of 50 to 50 for 3 min and then with THF for 0.1 min (flow rate 3 ml/min). The detection was effected by means of an evaporative light scattering detector.

Experiment 1

Polyarylene Ether (P1) Synthesis

Polyarylene ether with OH end groups, obtained by nucleophilic aromatic polycondensation of 287.08 g (1.000 mol) of dichlorodiphenyl sulfone, 249.42 g (1.0926 mol) of bisphenol A, under the action of 148.58 g (1.075 mol) of potassium carbonate (potash), in 476 ml of NMP. This mixture was kept at 190° C. for 6 hours. Thereafter, the mixture was diluted by adding 1500 ml of NMP. After cooling to <80° C., the suspension was discharged, the solid constituents were removed by filtration and the resulting polymer solution was provided for the alkoxylation.

A small portion of the solution was isolated by precipitation in NMP/water. After careful washing with water, the polyarylene ether was dried under reduced pressure at 120° C. for 12 h. The viscosity number of the polyarylene ether was 17.3 ml/g, the glass transition temperature 162° C., the proportion of phenolic OH groups 0.675% by weight.

Ethoxylation

A cleaned and dried steel reactor (rinsed once with isopropanol/acetone and baked out) was initially charged with the polymer solution (500 g) and inertized with nitrogen three times. Subsequently, the reactor pressure was adjusted to 1.5 bar with nitrogen and the reactor temperature was raised to 120° C. After the internal temperature had been attained, ethylene oxide (47.5 g; 1.08 mol) was metered in within 10 minutes. The mixture was stirred at 120° C. for 10 h and residual ethylene oxide was removed by introducing nitrogen. The block copolymer was discharged at 100° C. The block copolymer was isolated by precipitation in 1/9 NMP/water. After careful washing with water, the block copolymer was dried under reduced pressure at 120° C. for 12 h. The yield was 531.7 g.

Experiment 2

Polyarylene Ether (P2) Synthesis

Polyarylene ether with OH end groups, obtained by nucleophilic aromatic polycondensation of 287.08 g (1.000 mol) of dichlorodiphenyl sulfone, 238.61 g (1.0453 mol) of bisphenol A, under the action of 148.58 g (1.075 mol) of potassium carbonate (potash), in 476 ml of NMP. This mixture was kept at 190° C. for 6 hours.

Thereafter, the mixture was diluted by adding 1500 ml of NMP. After cooling to less than 80° C., the suspension was discharged, the solid constituents were removed by filtration and the resulting polymer solution was provided for the alkoxylation.

A small portion of the solution was isolated by precipitation in NMP/water. After careful washing with water, the polyarylene ether was dried under reduced pressure at 120° C. for 12 h. The viscosity number of the polyarylene ether was 28.1 ml/g, the glass transition temperature 174° C., the proportion of phenolic OH groups 0.40% by weight.

Ethoxylation

A cleaned and dried steel reactor (rinsed once with isopropanol/acetone and baked out) was initially charged with the polymer solution (1000 g) and inertized with nitrogen three times. Subsequently, the reactor pressure was adjusted to 1.5 bar with nitrogen and the reactor temperature was raised to 120° C. After the internal temperature had been attained, ethylene oxide (40.5 g; 0.91 mol) was metered in within 10 minutes. The mixture was stirred at 120° C. for 10 h and residual ethylene oxide was then removed by introducing nitrogen. The block copolymer was discharged at 100° C. The block copolymer was isolated by precipitation in NMP/water. After careful washing with water, the block copolymer was dried under reduced pressure at 120° C. for 12 h.

Experiment 3

Polyarylene Ether (P3) Synthesis

Polyarylene ether with OH end groups, obtained by nucleophilic aromatic polycondensation of 574.16 g (2.000 mol) of dichlorodiphenyl sulfone, 464.71 g (2.0357 mol) of bisphenol A, under the action of 297.15 g (2.15 mol) of potassium carbonate (potash), in 952 ml of NMP. The mixture was kept at 190° C. for 6 hours. Thereafter, the mixture was diluted by adding 2911 ml of NMP. After cooling to less than 80° C., the suspension was discharged, the solid constituents were removed by filtration and the resulting polymer solution was provided for the alkoxylation.

A small portion of the solution was isolated by precipitation in NMP/water. After careful washing with water, the polyarylene ether was dried under reduced pressure at 120° C. for 12 h. The viscosity number of the polyarylene ether was 43.6 ml/g, the glass transition temperature 183° C., the proportion of phenolic OH groups 0.60% by weight.

Ethoxylation

A cleaned and dried steel reactor (rinsed once with isopropanol/acetone and baked out) was initially charged with the polymer solution (900 g) and inertized with nitrogen three times. Subsequently, the reactor pressure was adjusted to 1.5 bar with nitrogen and the reactor temperature was raised to 120° C. After the internal temperature had been attained, ethylene oxide (31.8 g; 0.72 mol) was metered in within 30 minutes. The mixture was stirred at 120° C. for 2 h until the pressure was constant and residual ethylene oxide was then removed by introducing nitrogen. The reaction product was discharged at 100° C. The product was isolated by precipitation in NMP/water. After careful washing with water, the product was dried under reduced pressure at 120° C. for 12 h. The yield was 931.8 g.

The products from Experiments 1 to 3 were obtained by precipitation in water, washed carefully, dried and then characterized by 1H NMR (D6-DMSO; polyethylene oxide content in the copolymer), DSC analyses (glass transition temperature), HPLC (polyethylene oxide content) and GPC analysis (THF, PS standards). Table 1 reproduces the data obtained in an overview.

TABLE 1

Block copolymers from Experiments 1-3.

| | Experiment | | |
|---|---|---|---|
| | 1 | 2 | 3 |
| Proportion of bound PEO in the block copo. [% by wt.] | 22.7 | 8.3 | 2.9 |
| Tg [° C.] | 59 | 106 | 157 |
| Proportion of unbound PEO [% by wt.] | less than 0.1 | less than 0.1 | less than 0.1 |
| Mw | 5606 | 15256 | 20481 |
| Mw/Mn | 2.3 | 2.1 | 2.1 |

Experiment 4

Polyarylene Ether (P4) Synthesis

Polyarylene ether with OH end groups, obtained by nucleophilic aromatic polycondensation of 574.16 g (2.000 mol) of dichlorodiphenyl sulfone, 512.09 g (2.047 mol) of dihydroxydiphenyl sulfone, under the action of 290.24 g (2.1 mol) of potassium carbonate (potash), in 1053 ml of NMP. The mixture was kept at 190° C. for 6 hours. After cooling to less than 80° C., the suspension was discharged, and the solid constituents were removed by filtration. The polyarylene ether was isolated by precipitation in NMP/water. After careful washing with water, the product was dried under reduced pressure at 120° C. for 12 h. The viscosity number of the polyarylene ether was 52.4 ml/g, the glass transition temperature 224° C., the proportion of phenolic OH groups 0.16% by weight. The polyarylene ether was used to prepare a 20% solution in NMP, and the resulting polymer solution was provided for the alkoxylation.

Ethoxylation

A cleaned and dried steel reactor (rinsed once with isopropanol/acetone and baked out) was initially charged with the polymer solution from Experiment 4 (900 g), 1.95 g of KOtBu were dissolved therein and the mixture was inertized three times with nitrogen. Subsequently, the reactor pressure was adjusted to 1.5 bar with nitrogen and the reactor temperature was raised to 120° C. After the internal temperature had been attained, ethylene oxide (45 g) was metered in within 10 minutes. The mixture was stirred at 120° C. for 10 h and residual ethylene oxide was removed by introducing nitrogen. The block copolymer was discharged at 100° C. The yield was 945 g. The block copolymer was isolated by precipitation in water/NMP at room temperature. The results of the characterization are listed in Table 2.

Experiment 5

Polyarylene Ether (P5) Synthesis

Polyarylene ether with OH end groups, obtained by nucleophilic aromatic polycondensation of 574.16 g (2.000 mol) of dichlorodiphenyl sulfone, 512.09 g (2.047 mol) of dihydroxydiphenyl sulfone, under the action of 290.24 g (2.1 mol) of potassium carbonate (potash), in 1053 ml of NMP. The mixture was kept at 190° C. for 6 hours. After cooling to less than 80° C., the suspension was discharged, and the solid constituents were removed by filtration. The polyarylene ether was isolated by precipitation in NMP/water. After careful washing with water, the polyarylene ether was dried under reduced pressure at 120° C. for 12 h. The viscosity number of the polyarylene ether was 52.4 ml/g, the glass transition temperature 224° C., the proportion of phenolic OH groups 0.16% by weight. The polyarylene ether was used to prepare a 20% solution in NMP, and the resulting polymer solution was provided for the alkoxylation.

Ethoxylation

A cleaned and dried steel reactor (rinsed once with isopropanol/acetone and baked out) was initially charged with the polymer solution from Experiment 5 (900 g), 1.19 g of KOtBu were dissolved therein and the mixture was inertized three times with nitrogen. Subsequently, the reactor pressure was adjusted to 1.5 bar with nitrogen and the reactor temperature was raised to 120° C. After the internal temperature had been attained, ethylene oxide (32 g) was metered in within 10 minutes. The mixture was stirred at 120° C. for 10 h and residual ethylene oxide was removed by introducing nitrogen. The block copolymer was discharged at 100° C. The yield was 930 g. The block copolymer was isolated by precipitation in water/NMP at room temperature. The results of the characterization are listed in Table 2.

Experiment 6

Polyarylene Ether (P6) Synthesis

Polyarylene ether with OH end groups, obtained by nucleophilic aromatic polycondensation of 574.16 g (2.000 mol) of dichlorodiphenyl sulfone, 512.09 g (2.047 mol) of dihydroxydiphenyl sulfone, under the action of 290.24 g (2.1 mol) of potassium carbonate (potash), in 1053 ml of NMP. The mixture was kept at 190° C. for 6 hours. After cooling to less than 80° C., the suspension was discharged, and the solid constituents were removed by filtration. The polyarylene ether was isolated by precipitation in NMP/water. After careful washing with water, the polyarylene ether was dried under reduced pressure at 120° C. for 12 h. The viscosity number of the polyarylene ether was 52.4 ml/g, the glass transition temperature 224° C., the proportion of phenolic OH groups 0.16% by weight. The polyarylene ether was used to prepare a 20% solution in NMP, and the resulting polymer solution was provided for the alkoxylation.

Ethoxylation

A cleaned and dried steel reactor (rinsed once with isopropanol/acetone and baked out) was initially charged with the polymer solution from Experiment 4 (900 g), 1.19 g of KOtBu were dissolved therein and the mixture was inertized three times with nitrogen. Subsequently, the reactor pressure was adjusted to 1.5 bar with nitrogen and the reactor temperature was raised to 120° C. After the internal temperature had been attained, ethylene oxide (15 g) was metered in within 10 minutes. The mixture was stirred at 120° C. for 10 h and residual ethylene oxide was removed by introducing nitrogen. The block copolymer was discharged at 100° C. The yield was 908 g.

The product is isolated by precipitation in water/NMP at room temperature. The results of the characterization are listed in Table 2.

TABLE 2

Block copolymers from Experiments 4-6.

| | Experiment | | |
|---|---|---|---|
| | 4 | 5 | 6 |
| Proportion of bound PEO in the block copo. [% by wt.] | 7.8 | 6.9 | 4.8 |
| Tg [° C.] | 172 | 189 | 194 |
| Proportion of unbound PEO [% by wt.] | less than 0.1 | less than 0.1 | less than 0.1 |
| Mw [GPC] | 38000 | 40500 | 41000 |
| Mw/Mn | 2.1 | 2.2 | 2.2 |

Comparative Experiment 7

58.5 g of a polysulfone with viscosity number 55.6 ml/g and 6.5 g of a polyethylene glycol with M, 8000 g/mol, 200 ml of DMSO, 65 ml of toluene and 5.6 g of potassium carbonate were heated to 145° C. under reflux for 9 h. To isolate the product, the solution cooled to room temperature was admixed while stirring with 100 g of isopropanol, then with 200 g of hexane. The precipitated polymer was washed twice with water. Thereafter, the product was extracted with water at 95° C. The proportion of PEO segments was 3.2% by weight (1H NMR); the molecular weight distribution Mw/Mn (GPC with THF as the eluent, UV detector, PS standards) was 3.7.

The invention claimed is:

1. A process for preparing a block copolymer comprising polyarylene ether and polyalkylene oxide blocks, comprising reacting an HO-terminated polyarylene ether with a monomeric alkylene oxide, wherein the HO-terminated polyarylene ether is formed from units of the general formula I having predominantly phenoxide end groups

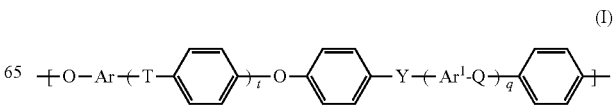

wherein t and q: each independently 0, 1, 2 or 3,

Q, T and Y: each independently a chemical bond or group selected from —O—, —S—, —SO$_2$—, S=O, C=O, —N=N—, —CR$^a$R$^b$— where R$^a$ and R$^b$ are each independently a hydrogen atom or a C$_1$-C$_{12}$-alkyl, C$_1$-C$_{12}$-alkoxy or C$_6$-C$_{18}$-aryl group, where at least one of Q, T and Y is not —O—, and at least one of Q, T and Y is —SO$_2$—, and where when t and q are both 0, at least one of Y is —SO$_2$—, and Ar and Ar$^1$: each independently an arylene group having from 6 to 18 carbon atoms.

2. The process according to claim 1, comprising preparing the HO-terminated polyarylene ether is prepared in a first step and reacting the HO-terminated polyarylene ether in a second step.

3. The process according to claim 1, wherein the reaction is performed in the presence of a solvent.

4. The process according to claim 1, wherein the reaction is performed in an NMP-containing solvent.

5. The process according to claim 1, wherein the monomeric alkylene oxide is selected from the group consisting of ethylene oxide, propylene oxide, 1,2-butylene oxide, 2,3-butylene oxide, 1,2-pentene oxide, 2,3-pentene oxide and mixtures thereof.

6. The process according to claim 1, wherein the block copolymer is prepared without having a workup of the OH-terminated polyareylene ether.

7. The process according to claim 1, wherein the process is performed under inert gas atmosphere.

8. The process according to claim 1, wherein the polyarylene ether is prepared by polycondensation of starting compounds in dipolar aprotic solvent at elevated temperature.

* * * * *